UNITED STATES PATENT OFFICE.

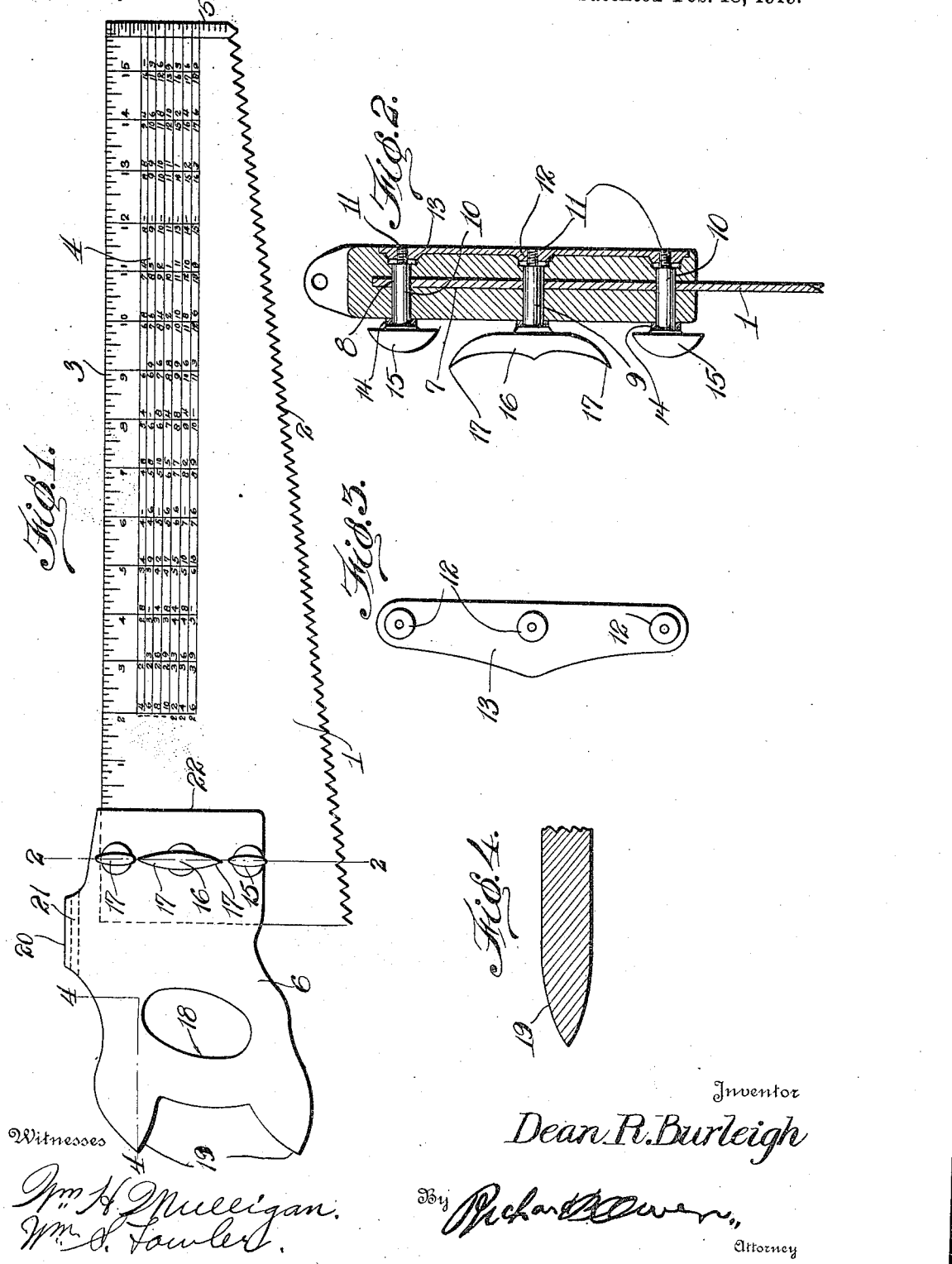

DEAN R. BURLEIGH, OF FARMINGTON, NEW HAMPSHIRE.

SAW ATTACHMENT.

1,294,767. Specification of Letters Patent. Patented Feb. 18, 1919.

Application filed August 8, 1916. Serial No. 113,804.

*To all whom it may concern:*

Be it known that I, DEAN R. BURLEIGH, a citizen of the United States, residing at Farmington, in the county of Strafford and State of New Hampshire, have invented certain new and useful Improvements in Saw Attachments, of which the following is a specification.

This invention relates to geometrical instruments, and more especially to those of the straight-edge type involving the leveling feature; and the primary object of the same is to produce an attachment to the handle of an ordinary saw by means of which the operator can level the top of one fence post with the top of another at a considerable distance away, providing the first fence post stands plumb.

Another object is to mount the saw blade detachably within the handle, and inscribe it with a scale for measuring purposes and a table of lumber measure.

With these general objects in view and others that will appear as the nature of the invention is better understood, the same consists in the novel combination and arrangement of parts hereinafter more fully described, illustrated in the accompanying drawings, and pointed out in the appended claim.

In the drawings forming a part of this application and in which like-designating characters refer to corresponding parts throughout the several views:

Figure 1 is an elevation of the complete saw.

Fig. 2 is a transverse section on line 2—2 of Fig. 1.

Fig. 3 is a plan view of the securing blade for the handle, and

Fig. 4 is an enlarged detail section on line 4—4 of Fig. 1.

Referring more in detail to the drawings, 1 designates the saw blade which is provided with the usual teeth 2 along its forward edge, while marks of graduation are provided along the rear edge and upon one side face of the blade to indicate inches and fractions of inches, as shown at 3. A scale 4 for finding the number of board feet in a board after determining the length and width of the same, and known as the Essex board measure, is also provided upon the side face of the saw blade 1 and connected with the scale 3. A scale 5 is also provided along the forward end of the saw to indicate small fractions of inches and this scale may be found useful in measuring boards and other material to be cut.

The saw blade 1 is adapted to be secured in a special form of handle 6, said handle being provided in its forward end with a slot 7 to receive the upper rear corner of the saw which is provided with a series of openings 8 for the central securing screw 9 and end securing screws 10. The screws 9 and 10 are extended transversely through the handle 6 and saw blade 1 and provided with reduced threaded extremities 11 adapted to be received in the sockets 12 formed upon the inner face of the blade 13. The blade 13 is adapted to be countersunk in one side of the handle 6, and it will be understood that the sockets 12 are received in suitable recesses formed in said side of the handle 6. It will be also understood that washers 14 or the like are mounted upon the screws 9 and 10 to prevent the heads of the same from wearing into the handle 6. The screws 10 have suitable heads 15 formed upon their opposite ends by means of which said screws may be readily manipulated while an elongated handle or head 16 is formed upon the corresponding end of the screw 9 and provided with pointed extremities 17, the purpose of which will presently appear.

The handle 6 is also provided with the usual eye or finger opening 18 in its main portion and rear end extensions 19 to limit movement of the thumb across the end of the handle and permit of a secure gripping action of the hand upon the handle. It will be understood that the extensions 19 are beveled toward their pointed extremities to present smooth and rounded surfaces.

The most important feature of my present invention, however, consists in providing the handle 6 along its upper side with an enlargement indicated at 20 and in boring this enlargement with a longitudinal sight opening 21 which must of necessity be at strict right angles with the front end of the handle where it forms a shoulder 22 along either side of the saw blade 1. The opening 21 also is above and strictly in parallelism with the back of the saw blade 1. The enlargement and opening constitute what might be called a sight at the top of the handle itself, through which the operator can peep the same as he could look through the tubular sight on a gun. Assuming that he is setting up fence posts across a field or lot, starting with a corner post, he seats it properly in the ground and plumbs it with an appropriate instrument, tamping in the earth well around the post so as to hold it strictly upright and permit it to serve as a starting point for his line of fence. Now at a proper distance he sets the next post and in order to ascertain that the top of the second post is level with the top of the first, he has but to place one of the shoulders 22 against a corner of the first post and glance through the sight opening 21 across the top of the second post. I find by experience that much more accurate results can be attained by the use of a sight opening bored through an enlargement, than by merely glancing along the edge of a square or other right-angular member; and I find that it is an advantage rather than otherwise to have the saw handle cut off squarely at its inner end as indicated at 22 in the drawings.

From the foregoing, it will be readily apparent that the length or width of a board may be determined by simply placing the saw blade 1 upon the same with the shoulder 22 of the handle 6 in engagement with one side or end of the board, thereby positioning the marked rear edge of the saw blade 1 at right angles to the edge of the same with which said end 22 of the handle 6 is engaged and after finding the length and width of the board, the number of board feet in the same may be readily determined by the scale or table 4. As this is a well known form of scale or table, a detailed description of the same is believed to be unnecessary. It will be understood however that the scale 3 is extended from the end 22 of the handle 6 to the forward or free end of the saw blade 1 and the size of the scale or table 4 depends upon the length of the scale 3.

It will also be apparent that the blade 1 may be readily removed from the handle 6 and the blade having different teeth 2 formed thereon substituted for the same.

What I claim as new is:—

The herein described saw attachment consisting of a saw handle having an enlargement at the top thereof, the enlargement pierced with a longitudinal sight opening disposed above the line of and parallel with the back of the saw blade when said handle is attached to the blade, and the front end of the handle being provided with a shoulder at right angles to the axis of said opening, for use substantially as described.

In testimony whereof I affix my signature in presence of two witnesses.

DEAN R. BURLEIGH.

Witnesses:
 EDWIN L. PEET,
 EDWARD A. FERGUSON.

Copies of this patent may be obtained for five cents each, by addressing the "Commissioner of Patents, Washington, D. C."